US012659753B2

(12) United States Patent
Barry et al.

(10) Patent No.: US 12,659,753 B2
(45) Date of Patent: *Jun. 16, 2026

(54) SYSTEMS AND METHODS FOR FLEXIBLE ACCESS TO PRIORITY ACCESS TIERS IN SHARED RADIO FREQUENCY (RF) SPECTRUM BANDS

(71) Applicant: DISH WIRELESS L.L.C., Englewood, CO (US)

(72) Inventors: Owen W. Barry, Castle Rock, CO (US); Adam H. Saenger, Castle Pines, CO (US); Jennings Maxwell Orcutt, Denver, CO (US); Christopher Ergen, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 556 days.

This patent is subject to a terminal disclaimer.

(21) Appl. No.: 17/962,383

(22) Filed: Oct. 7, 2022

(65) Prior Publication Data

US 2023/0114225 A1 Apr. 13, 2023

Related U.S. Application Data

(60) Provisional application No. 63/253,924, filed on Oct. 8, 2021.

(51) Int. Cl.
| | |
|---|---|
| *H04W 16/14* | (2009.01) |
| *H04B 17/345* | (2015.01) |
| *H04W 28/24* | (2009.01) |

(52) U.S. Cl.
CPC .......... *H04W 16/14* (2013.01); *H04B 17/345* (2015.01); *H04W 28/24* (2013.01)

(58) Field of Classification Search
CPC ..... H04W 28/24; H04W 16/14; H04B 17/345
See application file for complete search history.

(56) References Cited

U.S. PATENT DOCUMENTS

| | | |
|---|---|---|
| 2014/0278623 A1 | 9/2014 | Martinez et al. |
| 2016/0094034 A1 | 3/2016 | Divan et al. |
| | (Continued) | |

FOREIGN PATENT DOCUMENTS

WO 2018/004641 A1 1/2018

OTHER PUBLICATIONS

Celona , "What is CBRS? How It Works & Why Your Enterprise Should Care", https://www.celona.io/cbrs/what-is-cbrs, 2022, 7 pages.

(Continued)

*Primary Examiner* — Dai Phuong
(74) *Attorney, Agent, or Firm* — Jeremiah J. Baunach; Frontier IP Law PLLC

(57) ABSTRACT

Embodiments include systems and methods for flexible access to priority access tiers in shared radio frequency (RF) spectrum bands. An example embodiment provides automated mechanisms for network operators to obtain the benefits of using a priority access license (PAL) in the Citizens Broadband Radio Service (CBRS), including access to such protected frequency bands, on an as-needed and/or on-demand basis without having to own a PAL (CBRS-As-A-Service (CAAS)). This CAAS thereby provides an "interference insurance" service to network operators. In response to receiving an indication of the at least one condition being met (e.g., a current interference level surpassing a threshold), a priority access tier license controller automatically causes the wireless network operator to be able to operate a wireless network using the PAL to the shared frequency spectrum band and thus be protected from RF interference by lower priority access users.

20 Claims, 15 Drawing Sheets

(56) References Cited

U.S. PATENT DOCUMENTS

| | | | | |
|---|---|---|---|---|
| 2017/0140349 | A1 | 5/2017 | Ricci | |
| 2019/0215698 | A1* | 7/2019 | Balachandran | H04W 88/12 |
| 2019/0279440 | A1 | 9/2019 | Ricci | |
| 2020/0027107 | A1 | 1/2020 | Lutnick et al. | |
| 2020/0092731 | A1* | 3/2020 | Beck | H04W 48/16 |
| 2021/0092615 | A1* | 3/2021 | Furuichi | H04W 16/14 |
| 2021/0243612 | A1* | 8/2021 | Kempf | H04W 28/18 |
| 2022/0337898 | A1 | 10/2022 | Dorogusker et al. | |

OTHER PUBLICATIONS

Federated Wireless , "Connectivity-as-a-service", https://federatedwireless.com/caas/, 2020, 2 pages.

Federated Wireless , "Spectrum Controller Freedom to go beyond", https://federatedwireless.com/, Oct. 29, 2020, 4 pages.

Ghai, Rajat , "CBRS: A Spectrum Policy Experiment—Cable is Best Positioned to Benefit", SCTE; Broadband Library; https://broadbandlibrary.com/cbrs-a-spectrum-policy-experiment-cable-is-best-positioned-to-benefit/, 2022, 9 pages.

Select Spectrum , "Wireless Spectrum Licenses in the 2.5 GHz Band Ideal for Broadband Mobile & Fixed Data Applications", http://selectspectrum.com, Sep. 2021, 2 pages.

Select Spectrum , "Wireless Spectrum Licenses in the CBRS Band (3550-3700 MHZ) Ideal for Fixed Wireless, Private LTE, IoT and Smart City Applications", http://selectspectrum.com to, Jun. 2021, 2 pages.

Wireless Innovation Forum , "CBRS Has Launched!", Wireless Innovation Forum Webinar, Jan. 28, 2020, 40 pages.

Wireless Innovation Forum , "Requirements for Commercial Operation in the U.S. 3550-3700 MHz Citizens Broadband Radio Service Band", Document WINNF-TS-0112; Version V1.9.1, Mar. 11, 2020, 81 pages.

Wireless Innovation Forum , "Signaling Protocols and Procedures for Citizens Broadband Radio Service (CBRS): Spectrum Access System (SAS)—Citizens Broadband Radio Service Device (CBSD) Interface Technical Specification", Document WINNF-TS-0016; Version V1.2.6, Nov. 25, 2020, 60 pages.

* cited by examiner

202 Receive an indication of at least one condition being met for leasing to a wireless network operator a priority access tier license to a shared frequency spectrum band 204 Automatically cause the wireless network operator to be able to operate a wireless network using the priority access tier license

206

Figure 3:
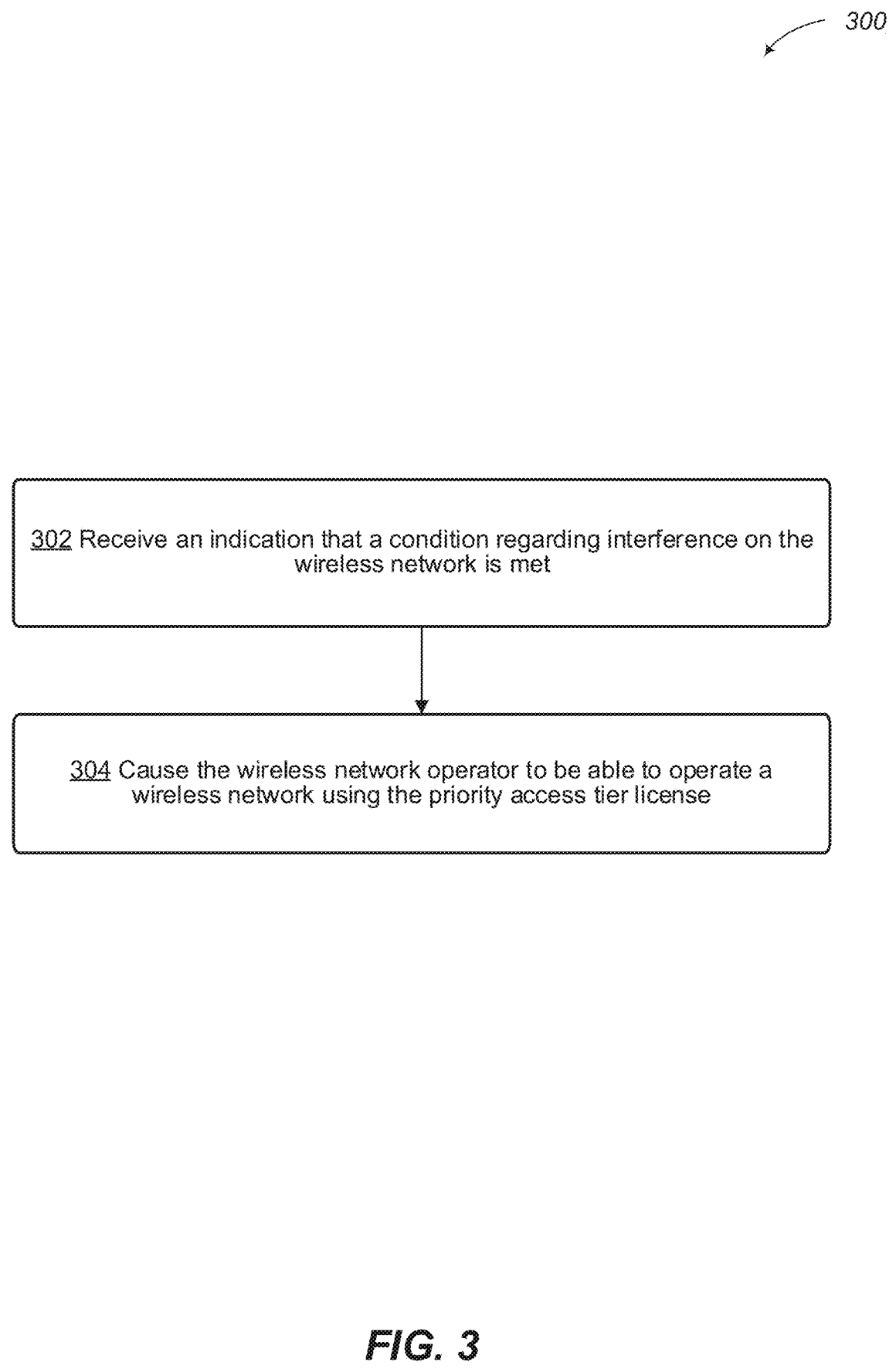

300

302 Receive an indication that a condition regarding interference on the wireless network is met 304 Cause the wireless network operator to be able to operate a wireless network using the priority access tier license

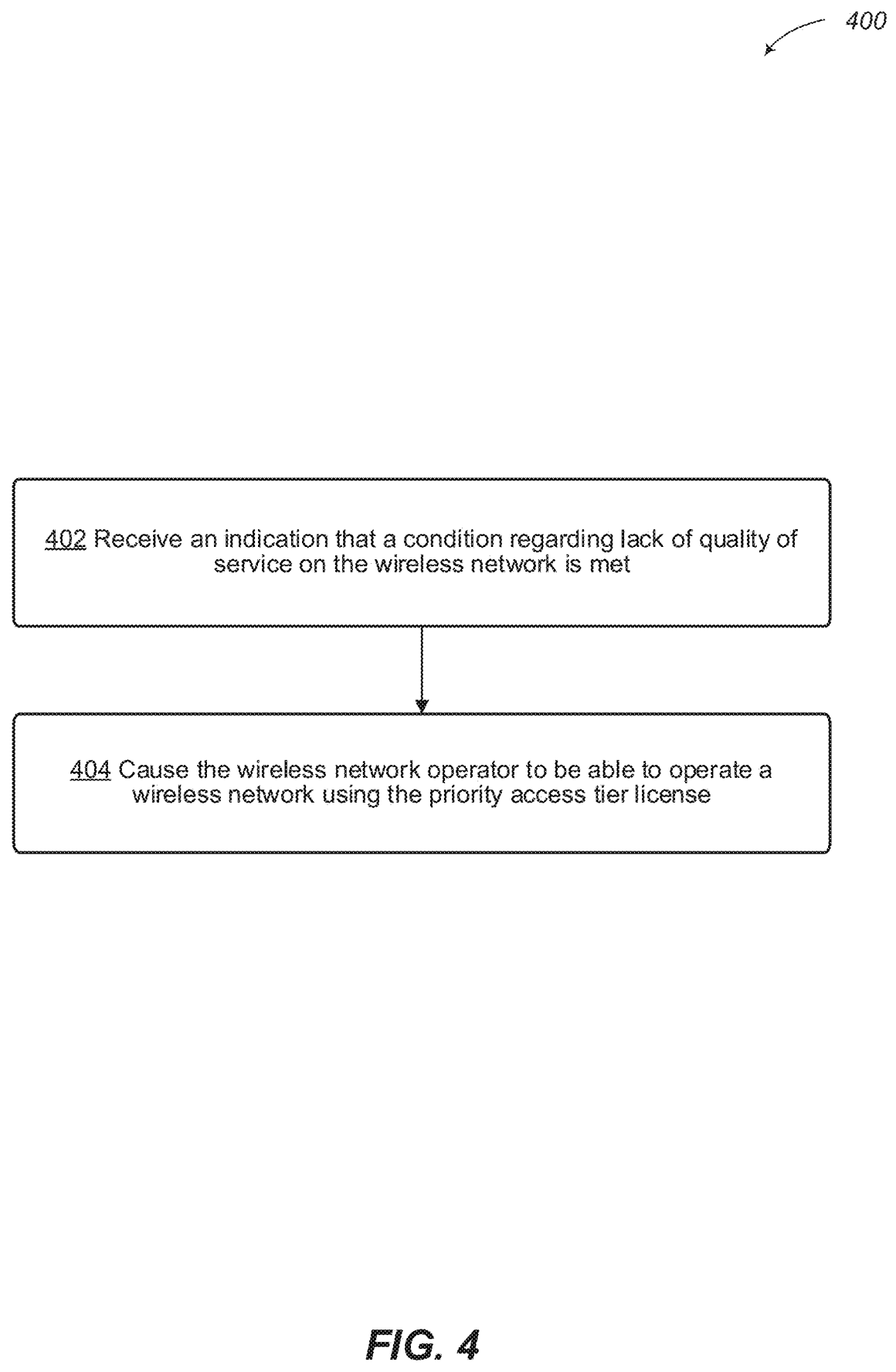

402 Receive an indication that a condition regarding lack of quality of service on the wireless network is met 404 Cause the wireless network operator to be able to operate a wireless network using the priority access tier license

*FIG. 4*

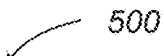
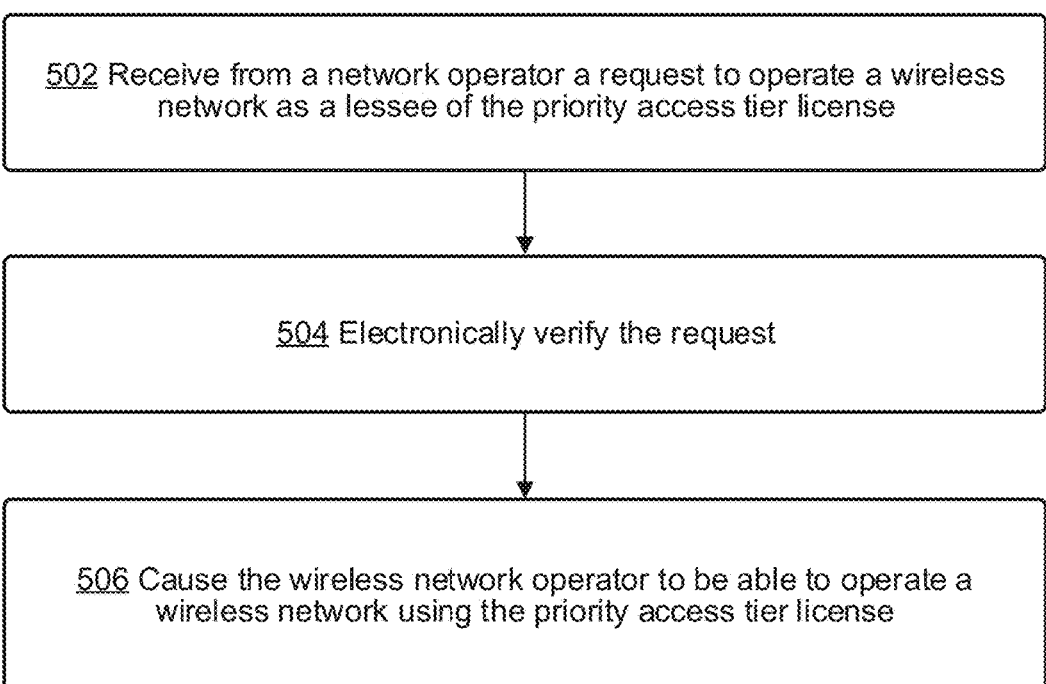
502 Receive from a network operator a request to operate a wireless network as a lessee of the priority access tier license
504 Electronically verify the request
506 Cause the wireless network operator to be able to operate a wireless network using the priority access tier license
*FIG. 5*

Figure 6:
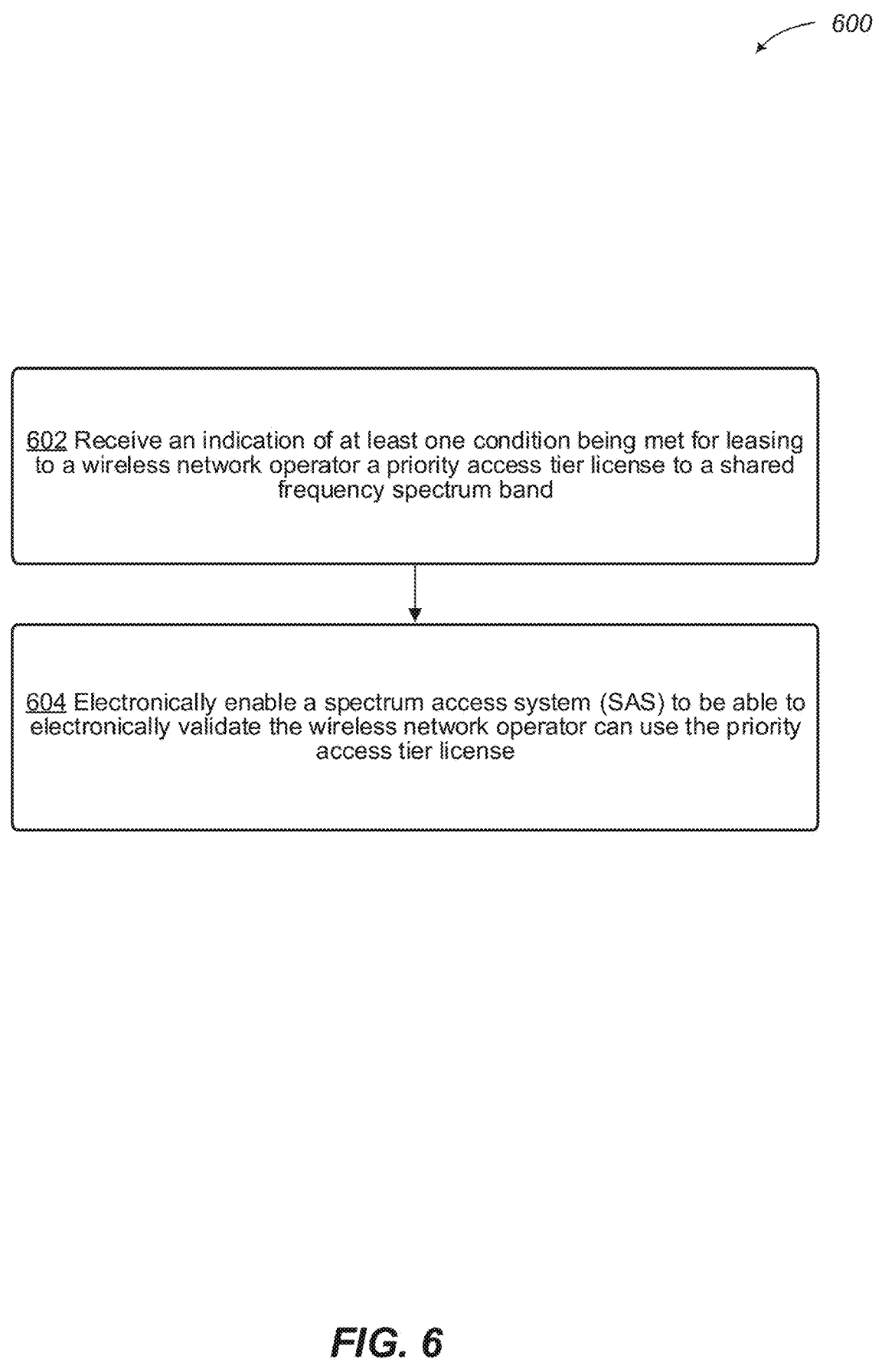

600

602 Receive an indication of at least one condition being met for leasing to a wireless network operator a priority access tier license to a shared frequency spectrum band 604 Electronically enable a spectrum access system (SAS) to be able to electronically validate the wireless network operator can use the priority access tier license

Figure 7:
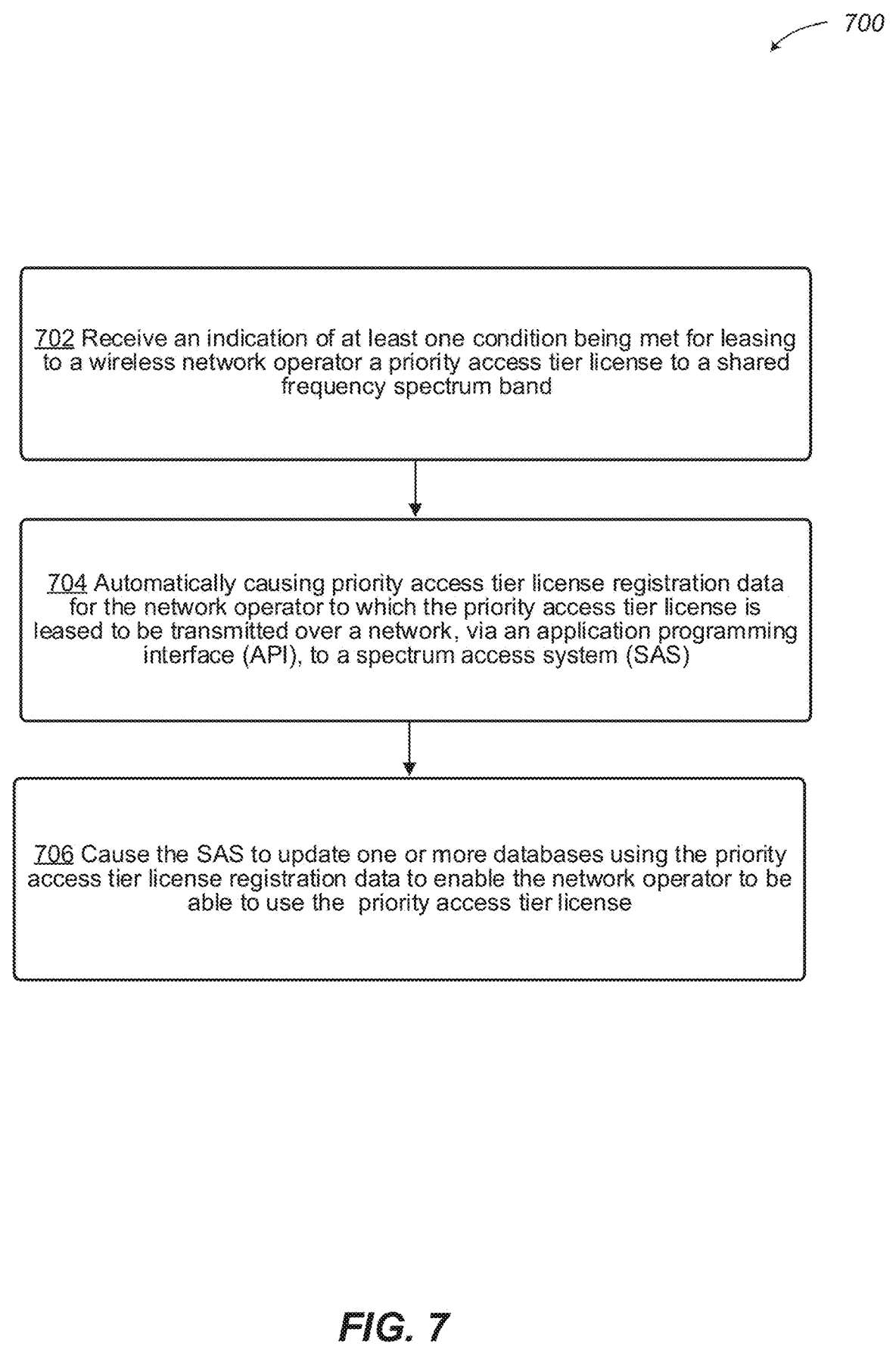

702 Receive an indication of at least one condition being met for leasing to a wireless network operator a priority access tier license to a shared frequency spectrum band 704 Automatically causing priority access tier license registration data for the network operator to which the priority access tier license is leased to be transmitted over a network, via an application programming interface (API), to a spectrum access system (SAS)

706 Cause the SAS to update one or more databases using the priority access tier license registration data to enable the network operator to be able to use the  priority access tier license

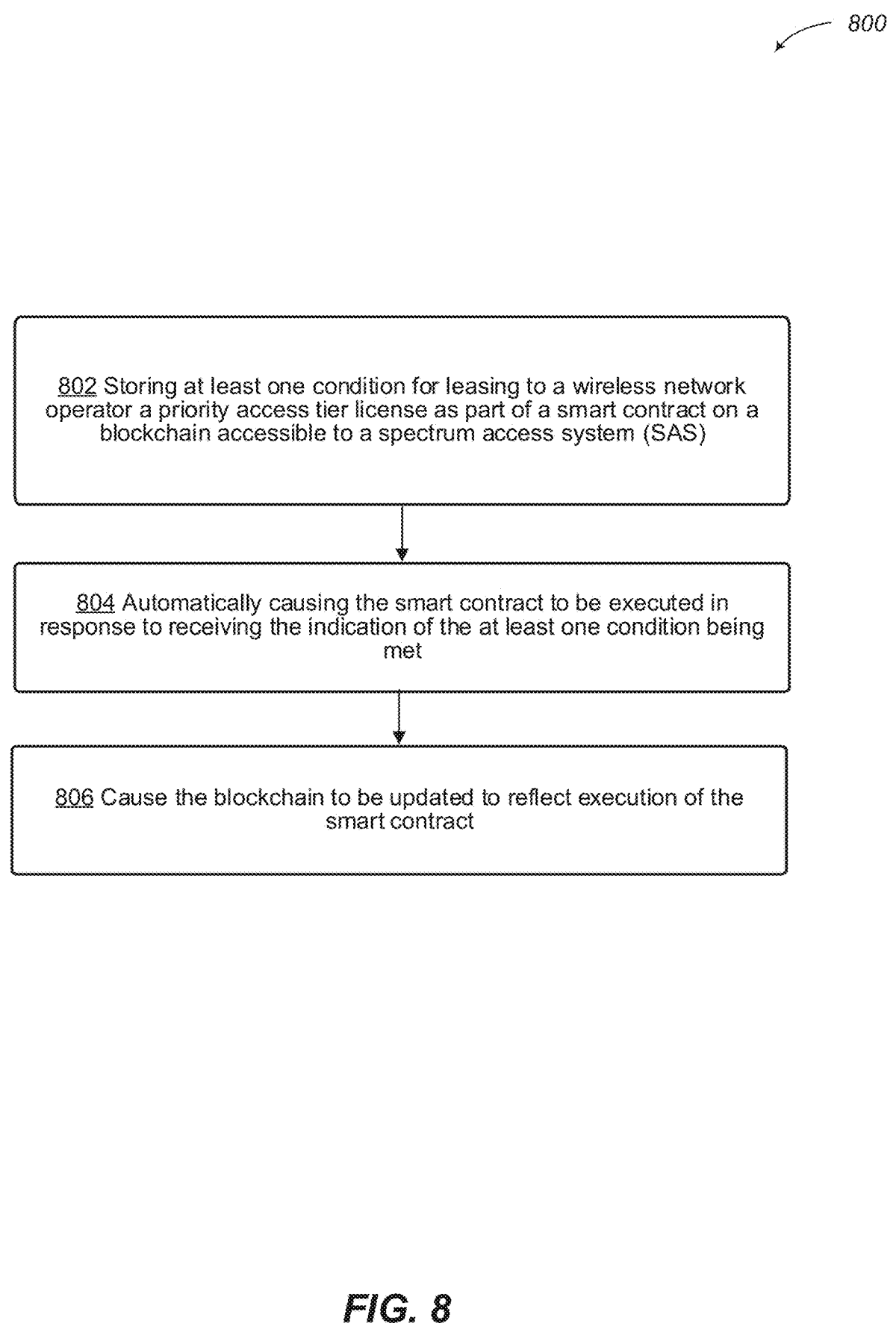

802 Storing at least one condition for leasing to a wireless network operator a priority access tier license as part of a smart contract on a blockchain accessible to a spectrum access system (SAS)

804 Automatically causing the smart contract to be executed in response to receiving the indication of the at least one condition being met 806 Cause the blockchain to be updated to reflect execution of the smart contract

FIG. 8

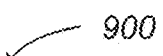

902 Electronically receive data indicative of wireless service quality factors regarding one or more wireless networks of one or more wireless network operators 904 Automatically determining one or more prices for leasing to one or more wireless network operators one or more priority access tier licenses to a shared frequency spectrum band based on the data indicative of wireless service quality factors

*FIG. 9*

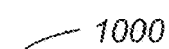

1000

1002 Electronically receive data indicative of wireless service quality factors regarding one or more wireless networks of one or more wireless network operators 1004 Automatically determining one or more prices for leasing to one or more wireless network operators one or more priority access tier licenses to a shared frequency spectrum band based on the data indicative of wireless service quality factors 1006 Automatically determining one or more durations for leasing to one or more wireless network operators one or more priority access tier licenses to a shared frequency spectrum band based on the data indicative of wireless service quality factors

*FIG. 10*

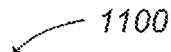

1100

1102 Electronically receive data indicative of wireless service quality factors regarding one or more wireless networks of one or more wireless network operators 1104 Automatically determining one or more prices for leasing to one or more wireless network operators one or more priority access tier licenses to a shared frequency spectrum band based on the data indicative of wireless service quality factors 1106 Receive updated data indicative of wireless service quality factors regarding one or more wireless networks of one or more wireless network operators 1108 Dynamically change in real time the one or more prices for leasing to one or more wireless network operators the one or more priority access tier licenses based on the updated data indicative of wireless service quality factors

*FIG. 11*

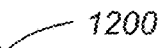

1202 Electronically receive data indicative of wireless service quality factors regarding one or more wireless networks of one or more wireless network operators 1204 Automatically determining one or more prices for leasing to one or more wireless network operators one or more priority access tier licenses to a shared frequency spectrum band based on the data indicative of wireless service quality factors 1206 Receive an indication of at least one condition being met for leasing to a particular wireless network operator a particular priority access tier license to the shared frequency spectrum band 1208 Automatically cause the particular wireless network operator to be able to operate a wireless network of the particular wireless network operator using the particular priority access tier license based on the determined one or more prices

*FIG. 12*

SYSTEMS AND METHODS FOR FLEXIBLE ACCESS TO PRIORITY ACCESS TIERS IN SHARED RADIO FREQUENCY (RF) SPECTRUM BANDS

TECHNICAL FIELD

The present disclosure relates generally to access to RF spectrum bands, more particularly, to flexible access to priority access tiers in shared RF spectrum bands.

BRIEF SUMMARY

As the use of smart phones and Internet of Things (IoT) devices has increased, so too has the desire for enterprise organizations to build their own private Long-Term Evolution (LTE) or Fifth-Generation (5G) wireless networks, both of which offer an "express lane" of wireless connectivity to critical enterprise applications that require wider coverage, interference-free wireless spectrum and guaranteed service level agreement (SLAs) for network performance metrics such as latency and throughput. Priority access tiers in shared spectrum frequency bands help to deliver such connectivity to network operators that would not otherwise have easy access to such protected frequency bands. For example, in the U.S., Citizens Broadband Radio Service (CBRS) is a band (band 48) of RF spectra from 3.5 GHz to 3.7 GHz for 3 types of users: 1. Incumbent users (e.g. the U.S. Navy) 2. Priority Access License (PAL) users (e.g. private organizations) and 3. General Authorized Access users (e.g. unlicensed users). In one example embodiment, the systems and methods disclosed herein provide automated mechanisms (also referred to herein as CBRS-As-A-Service (CAAS) for network operators to obtain the benefits of using a PAL in the CBRS on an as-needed basis without having to own the PAL.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 3 illustrates a logical flow diagram showing an example of a process for flexible access to priority access tiers in shared spectrum bands based on conditions regarding network interference in accordance with embodiments described herein.

FIG. 4 illustrates a logical flow diagram showing an example of a process for flexible access to priority access tiers in shared spectrum bands based on conditions regarding lack of quality of service on a wireless network in accordance with embodiments described herein.

FIG. 5 illustrates a logical flow diagram showing an example of a process for flexible access to priority access tiers in shared spectrum bands based on a request from a network operator in accordance with embodiments described herein.

FIG. 6 illustrates a logical flow diagram showing an example of a process for flexible access to priority access tiers in shared spectrum bands involving a spectrum access system (SAS) in accordance with embodiments described herein.

FIG. 7 illustrates a logical flow diagram showing an example of a process for flexible access to priority access tiers in shared spectrum bands involving causing a spectrum access system (SAS) to update one or more databases with license registration data in accordance with embodiments described herein.

FIG. 8 illustrates a logical flow diagram showing an example of a process for flexible access to priority access tiers in shared spectrum bands involving electronic execution of smart contracts on a blockchain in accordance with embodiments described herein.

FIG. 9 illustrates a logical flow diagram showing an example of a process for flexible access to priority access tiers in shared spectrum bands involving automatically determining prices for leasing priority access tier licenses.

FIG. 10 illustrates a logical flow diagram showing an example of a process for flexible access to priority access tiers in shared spectrum bands involving automatically determining durations of leases of priority access tier licenses.

FIG. 11 illustrates a logical flow diagram showing an example of a process for flexible access to priority access tiers in shared spectrum bands involving dynamically changing in real time the one or more prices for leases of priority access tier licenses.

FIG. 12 illustrates a logical flow diagram showing an example of a process for flexible access to priority access tiers in shared spectrum bands involving dynamically automatically determining prices for leasing priority access tier licenses and conditions being met for leasing a particular priority access tier license to a particular wireless network operator.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1A:
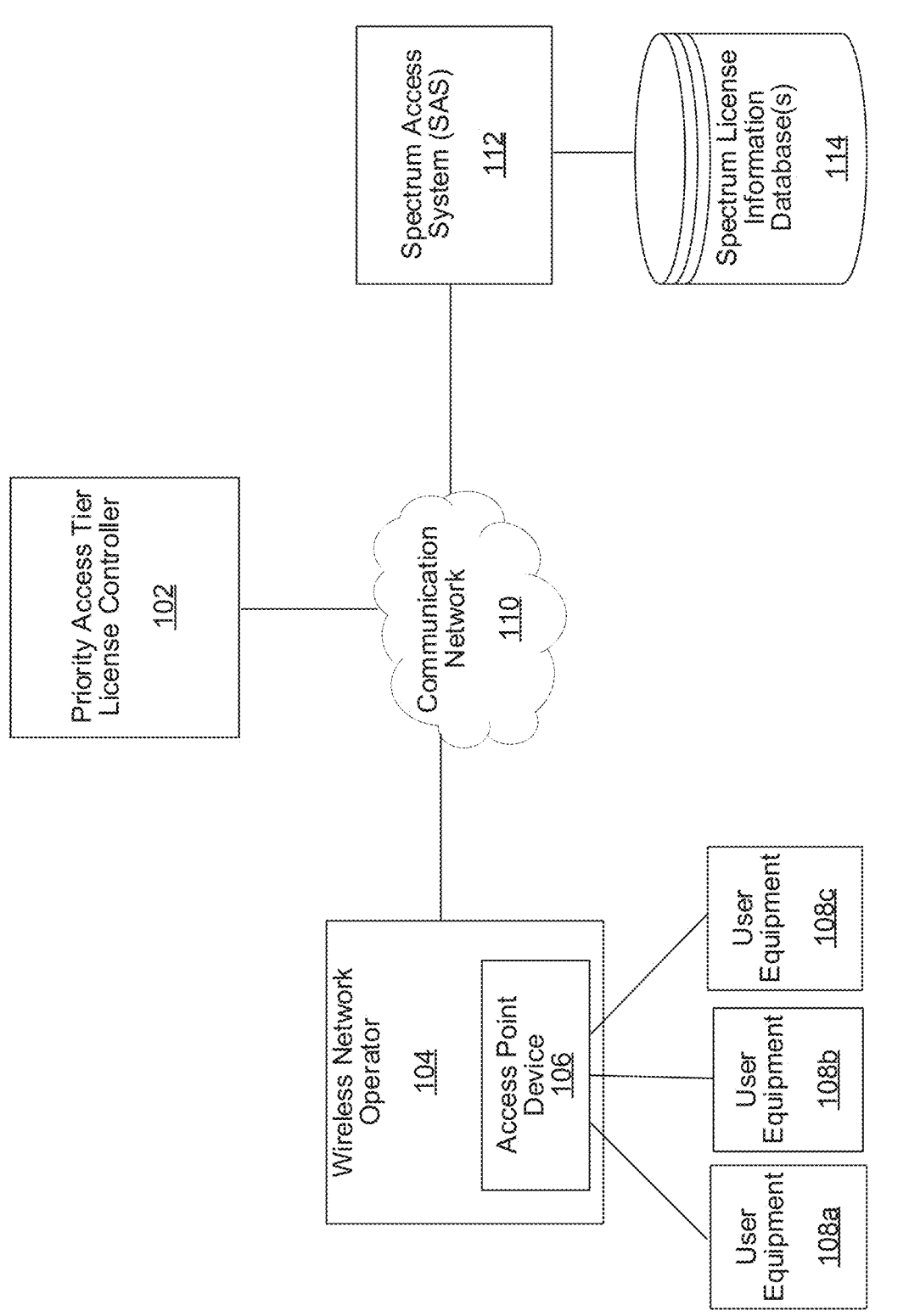
FIG. 1A illustrates a context diagram of an environment in which systems and methods for flexible access to priority access tiers in shared spectrum bands may be implemented in accordance with embodiments described herein.

FIG. 1A illustrates a context diagram of an environment in which systems and methods for flexible access to priority access tiers in shared RF spectrum bands may be implemented in accordance with embodiments described herein.

Shown is a priority access tier license controller 102 (e.g., a computerized system of, or otherwise controlled by, an owner of a priority access tier license or an entity authorized by the owner to act on behalf of the owner), a wireless network operator 104 that operates a wireless network including at least one access point device 106 used by a plurality of user equipment (UE) on the wireless network (e.g., UE 108a, UE 108b and UE 108c), a communication network 110, a spectrum access system (SAS) 112 and one or more spectrum license information database(s) 114 to which the SAS 112 has access. The computerized systems of the priority access tier license controller 102, the wireless network operator 104 and the SAS 112 are each operably coupled to a communication network 110 (e.g., the Internet) that enables secure electronic communication between such systems. In various embodiments, the computerized systems of the priority access tier license controller 102, the wireless network operator 104 and a spectrum access system (SAS) 112 may be implemented either as a network elements on dedicated hardware, as a software instances running on dedicated hardware, and/or as a virtualized functions instantiated on an appropriate platform, e.g., a cloud infrastructure.

In various embodiments, there may be multiple wireless network operators, such as wireless network operator 104 coupled to the communication network 110.

In an example embodiment, the systems and methods disclosed herein provide automated mechanisms for network operators, such as wireless network operator 104, to obtain the benefits of using a priority access license (PAL), such as that owned or controlled by the priority access tier license controller 102, in the Citizens Broadband Radio Service (CBRS) in real time on an as-needed basis without having to own the PAL. Such automated mechanisms disclosed herein are also referred to herein as CBRS-As-A-Service (CAAS). However, the systems and methods described herein for flexible access to priority access tiers in shared spectrum bands may be applicable to, and implemented in, other existing or future shared spectrum bands in which priority access tier licenses to such spectrum bands may be leased.

Figure 1B:
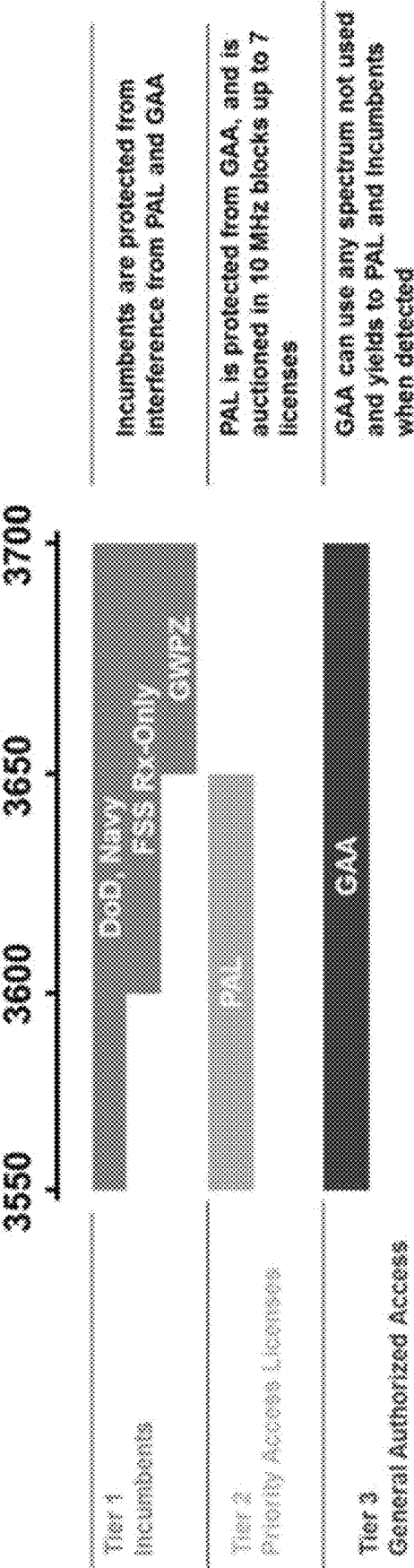
FIG. 1B is a chart illustrating different access tiers for the Citizens Broadband Radio Service (CBRS) shared frequency spectrum band.

With reference to FIG. 1B, in the U.S., CBRS is a band (band 48) of radio frequency spectra from 3.5 GHz to 3.7 GHz for 3 tiers of users: 1. Incumbent users (e.g. the U.S. Navy) 2. Priority Access License (PAL) users (e.g. private organizations) and 3. General Authorized Access users (e.g. unlicensed users). Incumbent (Tier 1) users include US Navy radar systems who will always get first-priority use that operate in the 3550-3700 MHz band. To protect this space, there are a number of Coastal Exclusion Zones that surround nearly all of the US coastline. This is to ensure naval vessels can still communicate with shipyards without interference. There are also protection zones located inland that protect the airways around fixed satellite space to earth radars in the 3600-3650 MHz band. This portion of the spectrum is protected against interference from Priority Access License (Tier 2) users and General Authorized Access (Tier 3) users.

Tier 2 is for Priority Access License PAL users. PAL licenses are awarded to the highest bidders and allow coverage on a county-by-county basis in the U.S. A single PAL license covers a 10 megahertz channel within the 3550-3650 MHz band, and are assigned in 10 year renewable blocks. PALs must accept interference from Incumbent (Tier 1) users but are provided protection from interference from the General Authorized Access (Tier 3) users. A CBRS PAL provides the owner of the PAL the right to use a 10-megahertz channel block that will be assigned dynamically by a spectrum access system (e.g., SAS 112). The SAS assigns specific channels on a dynamic basis in order to accommodate other users and protect incumbents. PALs are governed by a "use it or share it" principal. If a PAL licensee is not using the spectrum channel block(s) that are available to them under the PAL, GAA users can operate in that spectrum.

Tier 3 is for General Authorized Access (GAA). These are unlicensed users who are last in line to use the spectrum across the 3550-3700 MHz band. While this tier is the most open, it has no expectation of protection from interference from any other tier, or other GAA users.

CBRS can be used for fourth generation (4G) LTE or for fixed or mobile 5G New Radio (NR). The system relies on a series of CBRS standards that were developed by the Wireless Innovation Forum (WInnForum) in conjunction with the Federal Communications Commission (FCC). These standards consist of security measures, licensing details, and what protocols are used to communicate with devices. Certification programs were developed to help establish standards for installing proper CBRS deployments that follow the proper guidelines in identifying itself, as well as communicating with the necessary FCC databases for operation.

The FCC requires the use of a SAS administrator to coordinate and manage operations of the three tiers of CBRS to prevent interference to higher priority users. In the present example embodiment, the SAS 112 operates as such a SAS administrator and is a frequency coordination system that manages the CBRS spectrum in the 3.5 GHz band. The SAS 112 manages spectrum sharing on a dynamic, as-needed basis across three tiers. In particular, The SAS 112 dynamically manages spectrum for all three tiers with first priority for incumbents, second priority for PALs and third priority for GAA users. The SAS 112 connects to FCC databases, which may be included as part of, or represented by, spectrum license information database(s) 114, and incumbent reporting systems. In the present embodiment, PAL license owners (licensees), such as priority access tier license controller 102, can sell or sub-license (lease) their PALs to other operators, such as wireless network operator 104, for all or part of the geographic license area and/or frequency band associated with the PAL. Sub-license agreements (i.e., leases) are recorded in the FCC Universal Licensing System database, which in the present embodiment is part of or represented by the spectrum license information database(s) 114. To verify a licensee's claim of a PAL (e.g., a claim made by priority access tier license controller 102) or a lessee's claim of a sub-licensed or leased PAL (e.g., a claim made by or on behalf of wireless network operator 104), the SAS 112 checks the FCC ULS database in the spectrum license information database(s) 114.

As part of the CAAS, in some example embodiments, the sub-license agreements (i.e., leases) of PALs owned or controlled by the priority access tier license controller 102 to the wireless network operator 104 are recorded in the FCC Universal Licensing System database in the spectrum license information database(s) 114 via execution of a smart contract on a blockchain by a transaction initiated by the priority access tier license controller 102. In various embodiments, such execution may be performed automatically in response to a specific electronic request of the wireless network operator 104 and/or in response to a condition being met (e.g., a condition being met regarding current or expected interference or bandwidth usage on the wireless network operated by wireless network operator 104). Utilization of blockchain is provided as just one example of an additional possible aspect of an example embodiment of the present disclosure, and other embodiments are not dependent on utilizing blockchain technologies. The SAS 112 also interfaces with Environmental Sensing Capability (ESC) systems. ESC systems automatically detect radar use in the area.

Any component supporting a CBRS antenna or antenna array is a Citizens Broadband Radio Service Device (CBSD). Referring again to FIG. 1A, in the present example embodiment, the access point device 106 is a CBSD. CBSDs, such as access point device 106, register with the SAS 112 and request spectrum grants. Grants specify parameters including the allocated radio channels, required Effective Isotropic Radiated Power (EIRP), or maximum transmission power. A CBSD, such as access point device 106, also identifies its unique geolocation, height, indoor or outdoor status, and unique call sign registered with the FCC. The access point device 106, priority access tier license controller 102 and SAS 112 may communicate through Hypertext Transfer Protocol Secure (HTTPS) over communication network 110, with each message encoded via JavaScript Object Notation (JSON).

In the present example embodiment, to prevent interference across the three tiers, the SAS 112 acts as a frequency coordinator that prioritizes access between the Incumbents, Priority Access Licenses, and General Authorized Access tiers. The SAS 112 system can work in tandem with Environmental Sensing Capability (ESC) which relays important information regarding spectrum use from the Department of Defense. In various embodiments, the CAAS system herein enables, via the priority access tier license controller, the access point device 106 to register with the SAS 112 using the PAL access (PAL lease) provided by the priority access tier license controller 102, and in some embodiments may automatically register the access point device 106 with the SAS 112 and request the spectrum grant on behalf of the wireless network operator when a certain condition or conditions are met. An example condition may be a condition regarding current or expected interference or bandwidth usage on the wireless network operated by wireless network operator 104 reaching or surpassing a threshold amount or value. The CAAS system may also automatically deregister, using the priority access tier license controller 102, the access point device 106 with the SAS 112 when the condition in no longer being met or when one or more other conditions are met (e.g., a PAL lease duration is expired) via communication network 110.

Current technological mechanisms for accessing the supply of CBRS PALs by those entities who desire to utilize them lack a flexible and efficient way to do so, as the environment is relatively new, and is thus early on in the adoption curve. Similarly, very few models for offering CBRS PALs have been developed, constraining access to the supply. Thus, a technical solution to this technical problem is provided that provides CBRS PAL leases via the CAAS model disclosed herein. Referring again to FIG. 1A, the mechanisms of the CAAS model disclosed herein provide flexible on-demand access for network operators, such as network operator 104, to use one or more PALs owned or controlled by the priority access tier license controller 102 as an "interference insurance" service that mitigates current and/or expected wireless network interference experienced by GAA (Tier 3) users (e.g., network operator 104), or even experienced by users or service providers (also referred to herein as customers) of other wireless bands. All such customers are represented by network wireless operator 104. In some embodiments, the mechanisms of the CAAS model disclosed herein unlock higher-tier Service Level Agreements (SLAs) for customers who may be limited in the range of SLAs they can access via GAA (Tier 3).

In various embodiments, CAAS may be provided in near-real time, or well in advance of a customer's need, and also for short-term, dynamic usage, or based on a monthly or other periodic subscription. Additionally, in some embodiments, the pricing of the CAAS is dynamic, based on factors described below. Targeting rules and/or criteria for use of CAAS may be implemented before presentment to the customer, or may be used to implement co-management of access and use of the PALs once elected by the customer (e.g., by wireless network operator 104), such that when certain conditions are met in a geographic area (e.g., bandwidth usage, interference thresholds, etc.), customers or prospective customers within it are automatically notified about and/or provided the CAAS via the priority access tier license controller 102. The net result is an increased, more accessible supply of CBRS PALs for use by a variety of different entities and systems.

Dynamic pricing determination and duration determination of CBRS PALs provided for lease to customers, such as wireless network operator 104, as described herein increase overall PAL and CBRS utilization by automatically accounting for supply and demand of wireless network service bandwidth and quality based on a number of inputs. Such inputs may include currently experienced wireless service degradation, historically experienced wireless service degradation and/or projected wireless service degradation of one or more wireless networks operated by one or more wireless network operators, such as wireless network operator 104. Additional inputs used in various embodiments for dynamic price and duration-optimization of PAL leases include, but are not limited to: historical, current, or projected aggregate network bandwidth demand, segmentation of potential customers by peak and/or average bandwidth usage, SLA levels, and other indicators of customer price sensitivity, which all may be used over varying windows of time and may change over varying windows of time. The net result of implementation of such dynamic pricing determination and lease duration determination as part of CAAS is a pricing mechanism for CBRS PALs that achieves supply/demand equilibrium through a variety of dynamic pricing and duration inputs.

Figure 2A:
FIG. 2A illustrates a logical flow diagram showing an example of a process for flexible access to priority access tiers in shared spectrum bands in accordance with embodiments described herein.

FIG. 2A illustrates a logical flow diagram showing an example of a process 200 for flexible access to priority access tiers in shared spectrum bands in accordance with embodiments described herein.

At 202, the priority access tier license controller 102 electronically receives an indication of at least one condition being met for leasing to a wireless network operator a priority access tier license to a shared frequency spectrum band.

At 204, the priority access tier license controller 102, in response to receiving the indication of the at least one condition being met, automatically causes the wireless network operator to be able to operate a wireless network using the priority access tier license to the shared frequency spectrum band. In some embodiments, in response to receiving the indication of the condition being met, the priority access tier license controller 102 automatically causes the network operator to be able to switch from using a lower priority access tier of the shared frequency spectrum (e.g., GAA) to operating the wireless network using the priority access tier license (e.g., PAL). The lower priority access tier provides lower priority access to the shared frequency spectrum band than provided by the priority access tier license. In an example embodiment, the priority access tier license controller 102 is a system of a wireless network service provider that is an owner of the priority access tier license and the network operator is a current customer of the wireless network service provider.

In some embodiments, the priority access tier license controller 102 electronically receives an indication that a condition regarding lack of quality of service on the wireless network is met. The priority access tier license controller 102 then causes the wireless network operator to be able to operate a wireless network using the priority access tier license to the shared frequency spectrum band in response to receiving the indication that the condition regarding lack of quality of service on the wireless network is met.

In some embodiments, the priority access tier license controller 102 electronically enables a spectrum access system (SAS) to be able to electronically validate that the wireless network operator may operate a wireless network in a protection area within a service area of the priority access tier license of the priority access tier license controller 102 based on registration data associated with the network operator and with network equipment of the network operator deployed in the protection area.

In some embodiments, the priority access tier license controller 102, in response to receiving the indication of the at least one condition being met, electronically partitions the priority access tier license such that the network operator may operate a wireless network under the priority access tier license in a particular geographic area within a geographic area covered by the priority access tier license.

In some embodiments, the priority access tier license controller 102, in response to receiving the indication of the at least one condition being met, electronically disaggregates the priority access tier license by spectrally segmenting the priority access tier license by frequency such that the network operator may operate a wireless network under the priority access tier license in a frequency band covered by the priority access tier license that is less than a full bandwidth covered by the priority access tier license.

In an example embodiment, the priority access tier license is a PAL to use a 10 MHz channel within the 3550 to 3650 MHz band of the Citizens Broadband Radio Service (CBRS). The PAL provides protection from interference from GAA tier users of the CBRS shared frequency spectrum band. In some embodiments, the wireless network is a Fifth Generation (5G) wireless network.

Figure 2B:
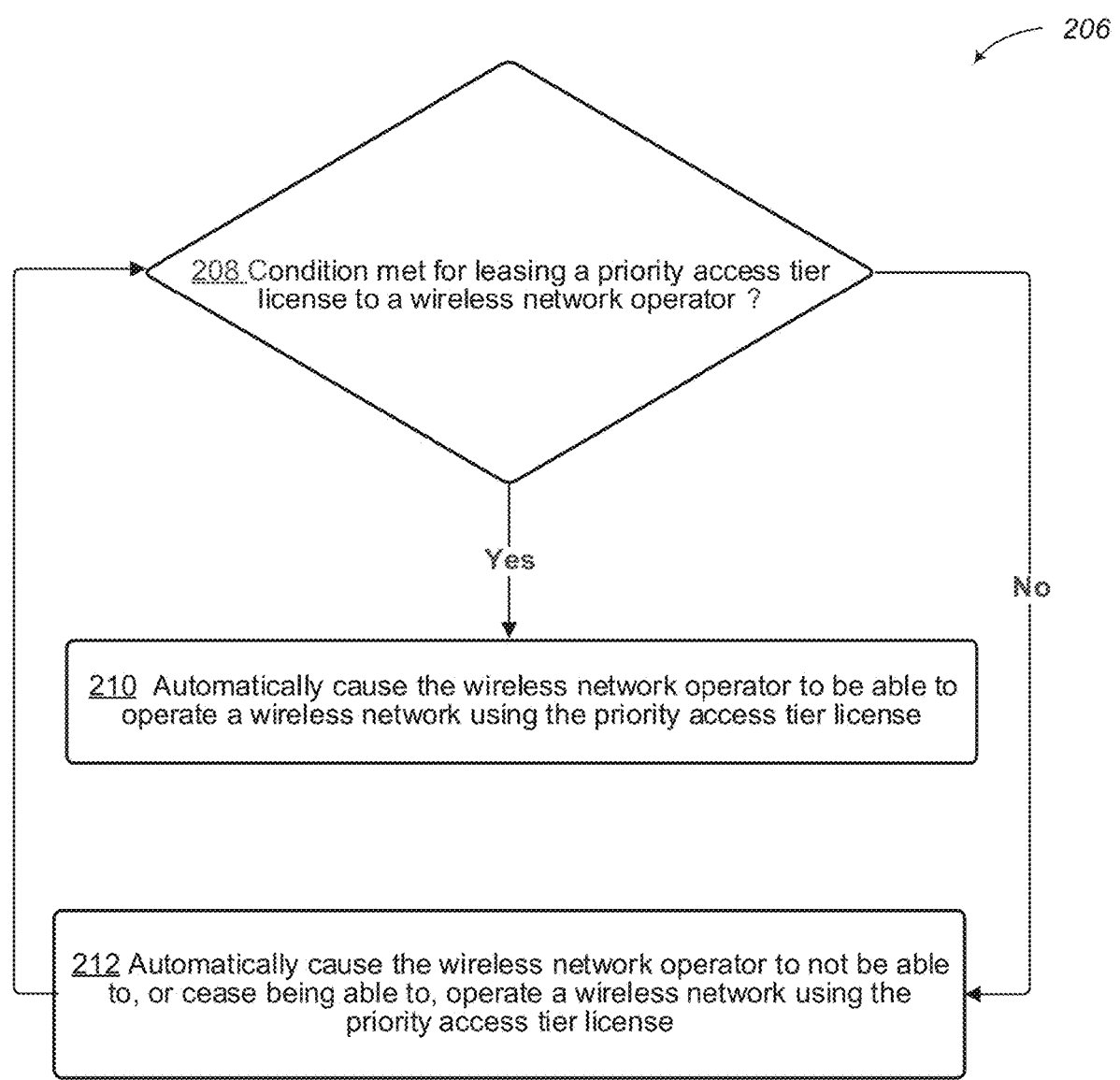
FIG. 2B illustrates a logical flow diagram showing another example of a process for flexible access to priority access tiers in shared spectrum bands in accordance with embodiments described herein.

FIG. 2B illustrates a logical flow diagram showing another example of a process 206 for flexible access to priority access tiers in shared spectrum bands in accordance with embodiments described herein.

At 208, the priority access tier license controller 102 determines whether a condition is met for leasing to a wireless network operator a priority access tier license to a shared frequency spectrum band. If the priority access tier license controller 102 determines that the condition is met for leasing to a wireless network operator a priority access tier license to a shared frequency spectrum band, the process 206 proceeds to 210. If the priority access tier license controller 102 determines that the condition is not met for leasing to the wireless network operator the priority access tier license, the process 206 proceeds to 212.

At 210, the priority access tier license controller 102, in response to determining that the condition is met for leasing to the wireless network operator the priority access tier license, automatically causes the wireless network operator to be able to operate a wireless network using the priority access tier license to the shared frequency spectrum band.

At 212, the priority access tier license controller 102, in response to determining that the condition is not or is no longer met for leasing to the wireless network operator the priority access tier license, automatically causes the wireless network operator to not be able to, or cease being able to, operate a wireless network using the priority access tier license. The process 206 then proceeds back to 208 to continuously check whether conditions are met for leasing to a wireless network operator a priority access tier license to a shared frequency spectrum band. Thus, dynamic, on-demand and real time (or near real time access) to PAL use is provided, which increases the efficiency, speed and reliability of wireless networks by providing more flexible access to higher priority levels of access to radio frequency spectrum, thereby increasing the network operator's ability to provide higher levels of service.

FIG. 3 illustrates a logical flow diagram showing an example of a process 300 for flexible access to priority access tiers in shared spectrum bands based on conditions regarding network interference in accordance with embodiments described herein.

At 302, the priority access tier license controller 102 electronically receives an indication that a condition regarding interference on the wireless network is met. For example, the condition may be that a threshold amount of detected interference on a network of the network operator has been surpassed.

At 304, the priority access tier license controller 102 automatically causes the wireless network operator to be able to operate a wireless network using the priority access tier license to the shared frequency spectrum band in response to receiving the indication that the condition regarding interference on the wireless network is met FIG. 4 illustrates a logical flow diagram showing an example of a process 400 for flexible access to priority access tiers in shared spectrum bands based on conditions regarding lack of quality of service on a wireless network in accordance with embodiments described herein.

At 402, the priority access tier license controller 102 electronically receives an indication that a condition regarding lack of quality of service on the wireless network is met. For example, the condition may be that a detected measurement of quality of service on a wireless network of the network operator has fallen below a threshold amount. In various embodiments, quantifiable quality of service indicators used to detect and measure quality of service on the wireless network may include, but are not limited to: latency (the measure of time it takes for data to reach its destination across a network), jitter, packet loss, throughput, packet duplication, packet reordering, and user quality of experience.

At 402, the priority access tier license controller 102, in response to receiving the indication that a condition regarding lack of quality of service on the wireless network is met, automatically causes the wireless network operator to be able to operate a wireless network using the priority access tier license to the shared frequency spectrum band in response to receiving the indication that the condition regarding lack of quality of service on the wireless network is met.

FIG. 5 illustrates a logical flow diagram showing an example of a process 500 for flexible access to priority access tiers in shared spectrum bands based on a request from a network operator in accordance with embodiments described herein.

At 502, the priority access tier license controller 102 electronically receives from the network operator a request to operate a wireless network as a lessee of the priority access tier license to the shared frequency spectrum band;

At 504, the priority access tier license controller 102 electronically verifies the request. For example, the priority access tier license controller 102 may verify that the network operator has a current CAAS subscription or PAL leasing arrangement with the priority access tier license controller 102 and that the request is from the network operator. Electronically receiving an indication of at least one condition being met for leasing the PAL to the network operator may include electronically receiving an indication that the request has been received and verified At 506, the priority access tier license controller 102 automatically causes the wireless network operator to be able to operate a wireless network using the priority access tier license to the shared frequency spectrum band in response to receiving the indication that the request has been received and verified.

FIG. 6 illustrates a logical flow diagram showing an example of a process 600 for flexible access to priority access tiers in shared spectrum bands involving a spectrum access system (SAS) in accordance with embodiments described herein.

At 602, the priority access tier license controller 102 electronically receives an indication of at least one condition being met for leasing to a wireless network operator a priority access tier license to a shared frequency spectrum band.

At 604, the priority access tier license controller 102 electronically enables a spectrum access system (SAS) to be able to electronically validate that the wireless network operator may operate a wireless network in a protection area within a service area of the priority access tier license based on registration data associated with the network operator and with network equipment of the network operator deployed in the protection area.

FIG. 7 illustrates a logical flow diagram showing an example of a process 700 for flexible access to priority access tiers in shared spectrum bands involving causing a spectrum access system (SAS) to update one or more databases with license registration data in accordance with embodiments described herein.

At 702, the priority access tier license controller 102 electronically receives an indication of at least one condition being met for leasing to a wireless network operator a priority access tier license to a shared frequency spectrum band.

At 704, the priority access tier license controller 102, in response to receiving the indication of at least one condition being met, automatically causes priority access tier license registration data for the network operator to which the priority access tier license is leased to be transmitted over a network, via an application programming interface (API), to a spectrum access system (SAS). The priority access tier license registration data may include, but is not limited to, one or more of: data indicative of an identity of a priority access tier license holder of the priority access tier license; a system-wide unique identifier for the priority access tier license; data indicative of an identity of the network operator to which the priority access tier license is leased; a start date and time of a lease at which the wireless network operator is able to operate a wireless network using the priority access tier license under the lease; an end date and time of the lease at which the wireless network operator is no longer able to operate a wireless network using the priority access tier license under the lease; identifiers of network equipment (e.g., network access points or base stations, such as CBSDs) of the network operator to which the priority access tier license is leased; registration data identifying the network operator to which the priority access tier license is leased as an owner of the network equipment; data indicative of the protection area, within the service area of the priority access tier license, applicable to the network equipment of the network operator to which the priority access tier license is leased; and data indicative of vertex points that define boundaries of the protection area.

At 706, the priority access tier license controller 102 automatically causes the SAS to update one or more databases using the priority access tier license registration data to enable the network operator to be able to operate a wireless network under the priority access tier license in a protection area, within a service area of the priority access tier license, applicable to the network equipment of the network operator to which the priority access tier license is leased.

FIG. 8 illustrates a logical flow diagram showing an example of a process 800 for flexible access to priority access tiers in shared spectrum bands involving electronic execution of smart contracts on a blockchain in accordance with embodiments described herein.

At 802, the priority access tier license controller 102 stores at least one condition as part of a smart contract on a blockchain accessible to a spectrum access system (SAS).

At 804, the priority access tier license controller 102 automatically causing the smart contract to be executed in response to receiving an indication of the at least one condition being met for leasing to a wireless network operator a priority access tier license to a shared frequency spectrum band.

At 806, the priority access tier license controller 102 causes the blockchain to be updated to reflect execution of the smart contract. In an example, embodiments, the priority access tier license controller 102 automatically causes priority access tier license registration data for the network operator to which the priority access tier license is leased to be stored on the blockchain. Storing of the priority access tier license registration data on the blockchain enables the SAS to be able to electronically validate via the blockchain that the wireless network operator may operate a wireless network using the priority access tier license to the shared frequency spectrum band in a protection area, within a service area of the priority access tier license, based on registration data.

FIG. 9 illustrates a logical flow diagram showing an example of a process 900 for flexible access to priority access tiers in shared spectrum bands involving automatically determining prices for leasing priority access tier licenses.

At 902, the priority access tier license controller 102 electronically receives data indicative of wireless service quality factors regarding one or more wireless networks of one or more wireless network operators.

At 904, the priority access tier license controller 102, in response to electronically receiving the data indicative of wireless service quality factors, automatically determines one or more prices for leasing to one or more wireless network operators one or more priority access tier licenses to a shared frequency spectrum band based on the data indicative of wireless service quality factors.

In an example embodiment, the wireless service quality factors may include, but are not limited to: wireless service degradation currently experienced on the one or more wireless networks; wireless service degradation historically experienced on the one or more wireless networks; projected wireless service degradation on the one or more wireless networks; historical aggregate network bandwidth demand associated with the one or more wireless networks; current aggregate network bandwidth demand associated with the one or more wireless networks; projected aggregate network bandwidth demand associated with the one or more wireless networks; peak bandwidth usage of particular network operators of the one or more network operators; average bandwidth usage of particular network operators of the one or more network operators, service levels associated with one or more service level agreement (SLAs) of particular network operators of the one or more network operators; and other service quality factors associated with the one or more wireless networks that change over time. The automatically determining one or more prices may then include electronically determining one or more prices for leasing to one or more wireless network operators one or more priority access tier licenses to the shared frequency spectrum band based on one or more of the above wireless service quality factors.

FIG. 10 illustrates a logical flow diagram showing an example of a process 1000 for flexible access to priority access tiers in shared spectrum bands involving automatically determining durations of leases of priority access tier licenses.

At 1002, the priority access tier license controller 102 electronically receives data indicative of wireless service quality factors regarding one or more wireless networks of one or more wireless network operators.

At 1004, the priority access tier license controller 102, in response to electronically receiving the data indicative of wireless service quality factors, automatically determines one or more prices for leasing to one or more wireless network operators one or more priority access tier licenses to a shared frequency spectrum band based on the data indicative of wireless service quality factors.

At 1006, the priority access tier license controller 102, in response to electronically receiving the data indicative of wireless service quality factors, automatically determines one or more durations for leasing to one or more wireless network operators one or more priority access tier licenses to a shared frequency spectrum band based on the data indicative of wireless service quality factors.

FIG. 11 illustrates a logical flow diagram showing an example of a process 1100 for flexible access to priority access tiers in shared spectrum bands involving dynamically changing in real time the one or more prices for leases of priority access tier licenses.

At 1102, the priority access tier license controller 102 electronically receives data indicative of wireless service quality factors regarding one or more wireless networks of one or more wireless network operators.

At 1104, the priority access tier license controller 102, in response to electronically receiving the data indicative of wireless service quality factors, automatically determines one or more prices for leasing to one or more wireless network operators one or more priority access tier licenses to a shared frequency spectrum band based on the data indicative of wireless service quality factors.

At 1106, the priority access tier license controller 102 electronically receives updated data indicative of wireless service quality factors regarding one or more wireless networks of one or more wireless network operators.

At 1108, the priority access tier license controller 102, in response to electronically receiving the updated data indicative of wireless service quality factors, dynamically changes in real time, or near real time, the one or more prices for leasing to one or more wireless network operators one or more priority access tier licenses to a shared frequency spectrum band based on the updated data indicative of wireless service quality factors. For example, as wireless service quality factor values decrease to indicate degraded wireless service quality of the wireless network operated by the network operator, the priority access tier license controller 102 may determine to increase the price of PAL leases to the network operator. Also, in some embodiments, as requests increase or the rate of conditions being met to lease a particular PAL (or a rate of requests increases over a particular time period for leases to a particular PAL), the priority access tier license controller 102 may determine to automatically increase the price of PAL leases to the particular PAL in proportion to the increase in the rate of requests.

FIG. 12 illustrates a logical flow diagram showing an example of a process 1200 for flexible access to priority access tiers in shared spectrum bands involving dynamically automatically determining prices for leasing priority access tier licenses and conditions being met for leasing a particular priority access tier license to a particular wireless network operator.

At 1202, the priority access tier license controller 102 electronically receives data indicative of wireless service quality factors regarding one or more wireless networks of one or more wireless network operators.

At 1204, the priority access tier license controller 102, in response to electronically receiving the data indicative of wireless service quality factors, automatically determines one or more prices for leasing to one or more wireless network operators one or more priority access tier licenses to a shared frequency spectrum band based on the data indicative of wireless service quality factors.

At 1206, the priority access tier license controller 102 electronically receives an indication of at least one condition being met for leasing to a particular wireless network operator a particular priority access tier license to the shared frequency spectrum band.

Figure 13:
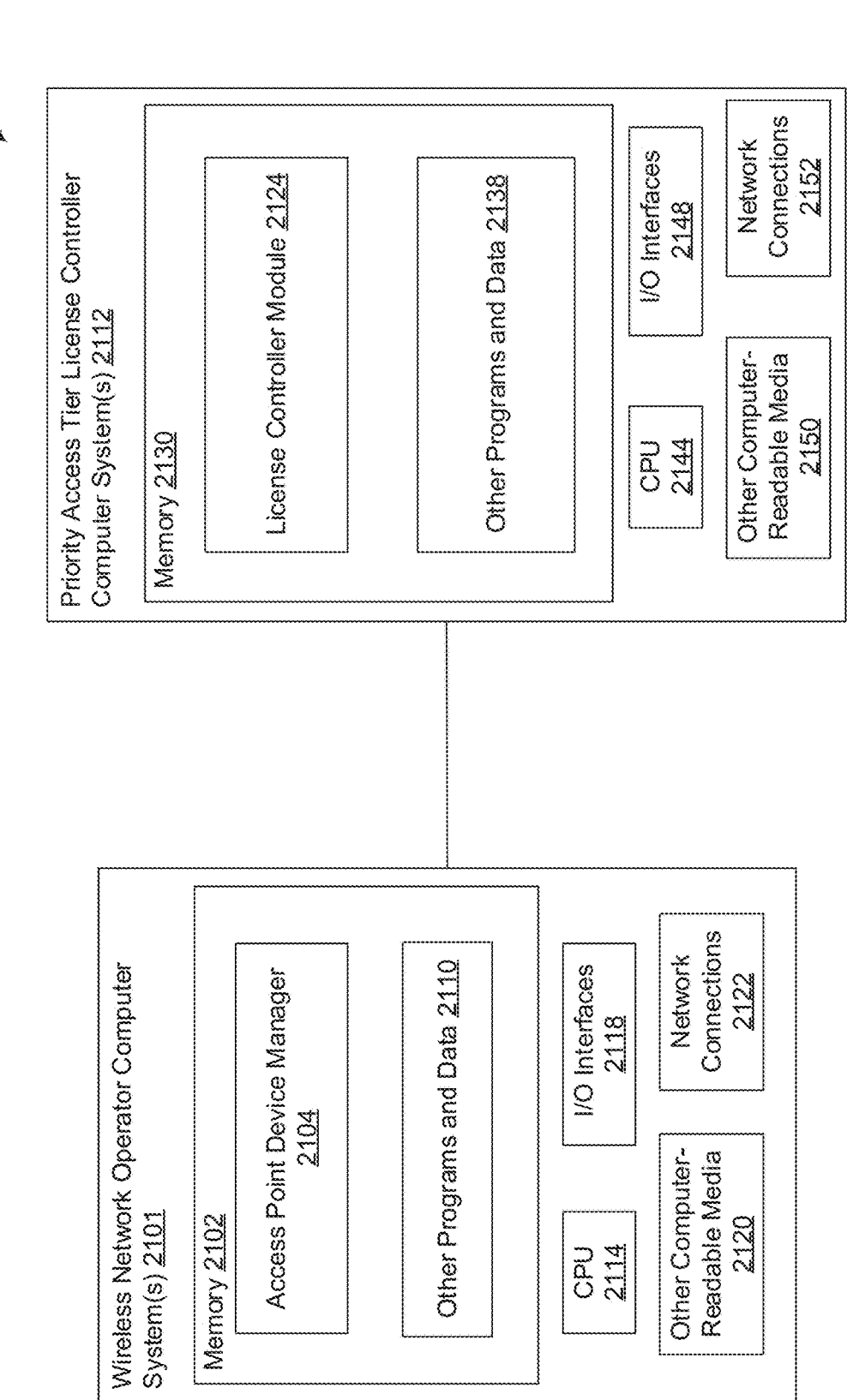
FIG. 13 shows a system diagram that illustrates various implementations of computing systems for implementing embodiments described herein.

At 1208, the priority access tier license controller 102, in response to receiving the indication of the at least one condition being met, automatically causes the particular wireless network operator to be able to operate a wireless network of the particular wireless network operator using the particular priority access tier license to the shared frequency spectrum band based on the determined one or more prices. In some embodiments, the priority access tier license controller 102 may automatically determine a price for leasing to the particular wireless network operator the particular priority access tier license based on the indication of the at least one condition being met and data indicative of wireless service quality factors associated with the wireless network of the particular wireless network operator FIG. 13 shows a system diagram that illustrates various implementations of computing systems for implementing embodiments described herein.

In various embodiments, the control systems of the wireless network operator 104, the priority access tier license controller 102, and the SAS 112 can be implemented either as a network elements on dedicated hardware, as a software instance running on dedicated hardware, or as a virtualized function instantiated on an appropriate platform, e.g., a cloud infrastructure. In some embodiments, operations and functionality of such systems may be completely software-based and designed as cloud-native, meaning that they're agnostic to the underlying cloud infrastructure, allowing higher deployment agility and flexibility. However, FIG. 13 illustrates an example of underlying hardware on which systems of the wireless network operator 104 and priority access tier license controller 102 may be implemented. For example, systems of the wireless network operator 104 may be implemented using wireless network operator computer system(s) 2101 and systems of the priority access tier license controller 102 may be implemented using priority access tier license controller computer system(s) 2112. In some embodiments, one or more special-purpose computing systems may be used to implement systems of the wireless network operator 104 and priority access tier license controller 102. Accordingly, various embodiments described herein may be implemented in software, hardware, firmware, or in some combination thereof. Wireless network operator computer system(s) 2101 may include memory 2102, one or more central processing units (CPUs) 2114, I/O interfaces 2118, other computer-readable media 2120, and network connections 2122.

Memory 2102 may include one or more various types of non-volatile and/or volatile storage technologies. Examples of memory 2102 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 2102 may be utilized to store information, including computer-readable instructions that are utilized by CPU 2114 to perform actions, including embodiments described herein.

Memory 2102 may have stored thereon access point device manager 2104. The access point device manager 2104 is configured to implement and/or perform some or all of the functions of the wireless network operator 102 described herein. Memory 2102 may also store other programs and data 2110, which may include network performance statistics, network interference statistics, quality of service statistics, throughput statistics, databases, user interfaces, operating systems, other network management functions, other NFs, etc.

Network connections 2122 are configured to communicate with other computing devices to facilitate the load balancing described herein. In various embodiments, the network connections 2122 include transmitters and receivers (not illustrated) to send and receive data as described herein, such as sending data to and receiving data from the priority access tier license controller 102 and the SAS 112 to send and receive instructions, commands and data to implement the processes described herein. I/O interfaces 2118 may include a video interfaces, other data input or output interfaces, or the like. Other computer-readable media 2120 may include other types of stationary or removable computer-readable media, such as removable flash drives, external hard drives, or the like.

In some embodiments, one or more special-purpose computing systems may be used to implement systems of the wireless network operator 104. Accordingly, various embodiments described herein may be implemented in software, hardware, firmware, or in some combination thereof.

Priority access tier license controller computer system(s) 2112 is an example of a computer system that may implement systems of the priority access tier license controller 102. Computer system(s) 2112 may include memory 2130, one or more central processing units (CPUs) 2144, I/O interfaces 2148, other computer-readable media 2150, and network connections 2152.

Memory 2130 may include one or more various types of non-volatile and/or volatile storage technologies similar to memory 2102. Memory 2130 may be utilized to store information, including computer-readable instructions that are utilized by CPU 2144 to perform actions, including embodiments described herein.

Memory 2130 may have stored thereon priority access tier license controller module 2124. The priority access tier license controller module 214 receives the messages or instructions from the access point device manager 204 to perform the operations and implement the functionality described herein that provide flexible access to priority access tiers in shared spectrum bands and other CAAS operations described herein. Memory 2130 may also store other programs and data 2138, which may include data indicative of conditions being for leasing to a wireless network operator a priority access tier license to a shared frequency spectrum band; wireless service quality factors on which determinations regarding prices for leasing to one or more wireless network operators one or more priority access tier licenses are based; bandwidth and/or interference thresholds on which conditions for leasing to a wireless network operator a priority access tier license are based, databases, PAL leasing rules, AI or ML programs to perform predictive analysis of conditions being or thresholds being surpassed regarding expected network interference and/or bandwidth usage, databases, user interfaces, operating systems, other network management functions, other NFs, etc.

Network connections 2152 are configured to communicate with other computing devices, such as wireless network operator computer system(s) 2101 and SAS 112. In various embodiments, the network connections 2152 include transmitters and receivers (not illustrated) to send and receive data as described herein. I/O interfaces 2148 may include one or more other data input or output interfaces. Other computer-readable media 2150 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a memory that stores computer-executable instructions; and
a processor that executes the computer-executable instructions to perform actions, the actions including:
electronically receiving, by a device of an owner of a priority access tier license to a shared frequency spectrum band, an indication of at least one condition being met for leasing to a wireless network operator the priority access tier license to a shared frequency spectrum band; and
in response to receiving the indication of the at least one condition being met, the system automatically causing the wireless network operator to be able to operate a wireless network using the priority access tier license to the shared frequency spectrum band.

2. The system of claim 1, wherein automatically causing the network operator to be able to operate a wireless network under the priority access tier license includes:
in response to receiving the indication of the at least one condition being met, automatically causing the network operator to be able to switch from using a lower priority access tier of the shared frequency spectrum to operating the wireless network using the priority access tier license, wherein the lower priority access tier provides lower priority access to the shared frequency spectrum band than provided by the priority access tier license.

3. The system of claim 1, wherein:
the electronically receiving an indication of at least one condition being met includes electronically receiving an indication that a condition regarding interference on the wireless network is met; and
the automatically causing the wireless network operator to be able to operate a wireless network using the priority access tier license to the shared frequency spectrum band includes causing the wireless network operator to be able to operate a wireless network using the priority access tier license to the shared frequency spectrum band in response to receiving the indication that the condition regarding interference on the wireless network is met.

4. The system of claim 3 wherein the condition regarding interference on the wireless network is a condition regarding a threshold level of current interference experienced on the wireless network being met or exceeded.

5. The system of claim 3 wherein the condition regarding interference on the wireless network is a condition regarding a threshold level of expected interference on the wireless network being met or exceeded.

6. The system of claim 1, wherein:
the electronically receiving an indication of at least one condition being met includes electronically receiving an indication that a condition regarding lack of quality of service on the wireless network is met; and the automatically causing the wireless network operator to be able to operate a wireless network using the priority access tier license to the shared frequency spectrum band includes causing the wireless network operator to be able to operate a wireless network using the priority access tier license to the shared frequency spectrum band in response to receiving the indication that the condition regarding lack of quality of service on the wireless network is met.

7. The system of claim 1, wherein:
the processor executes the computer-executable instructions to perform further actions including:
electronically receiving from the network operator a request to operate a wireless network as a lessee of the priority access tier license to the shared frequency spectrum band; and
electronically verifying the request;
the electronically receiving an indication of at least one condition being met includes electronically receiving an indication that the request has been received and verified; and
the automatically causing the wireless network operator to be able to operate a wireless network using the priority access tier license to the shared frequency spectrum band includes causing the wireless network operator to be able to operate a wireless network using the priority access tier license to the shared frequency spectrum band in response to receiving the indication that the request has been received and verified.

8. The system of claim 7 wherein the request to operate a wireless network as a lessee of the priority access tier license to the shared frequency spectrum band is a request to unlock a higher-tier service level for the network operator that provides a higher level of wireless service than currently available in a wireless frequency band currently being used by the network operator to operate the wireless network.

9. The system of claim 1 wherein the system is controlled by the owner of the priority access tier license.

10. The system of claim 1, wherein automatically causing the network operator to be able to operate a wireless network under the priority access tier license includes:
electronically enabling a spectrum access system (SAS) to be able to electronically validate that the wireless network operator may operate a wireless network in a protection area within a service area of the priority access tier license based on registration data associated with the network operator and with network equipment of the network operator deployed in the protection area.

11. The system of claim 1, wherein automatically causing the network operator to be able to operate a wireless network under the priority access tier license includes:
in response to receiving the indication of the at least one condition being met, automatically causing priority access tier license registration data for the network operator to which the priority access tier license is leased to be transmitted over a network, via an application programming interface (API), to a spectrum access system (SAS); and
causing the SAS to update one or more databases using the priority access tier license registration data to enable the network operator to be able to operate a wireless network under the priority access tier license in a protection area, within a service area of the priority access tier license, applicable to the network equipment of the network operator to which the priority access tier license is leased.

12. The system of claim 11 wherein the priority access tier license registration data includes:

data indicative of an identity of a priority access tier license holder of the priority access tier license;

a system-wide unique identifier for the priority access tier license;

data indicative of an identity of the network operator to which the priority access tier license is leased;

a start date and time of a lease at which the wireless network operator is able to operate a wireless network using the priority access tier license under the lease;

an end date and time of the lease at which the wireless network operator is no longer able to operate a wireless network using the priority access tier license under the lease;

identifiers of network equipment of the network operator to which the priority access tier license is leased;

registration data identifying the network operator to which the priority access tier license is leased as an owner of the network equipment;

data indicative of the protection area, within the service area of the priority access tier license, applicable to the network equipment of the network operator to which the priority access tier license is leased; and data indicative of vertex points that define boundaries of the protection area.

13. The system of claim 1 wherein the processor executes the computer-executable instructions to perform further actions including:

storing the at least one condition as part of a smart contract on a blockchain accessible to a spectrum access system (SAS), wherein the automatically causing the network operator to be able to operate a wireless network under the priority access tier license includes automatically causing the smart contract to be executed in response to receiving the indication of the at least one condition being met; and causing the blockchain to be updated to reflect execution of the smart contract.

14. The system of claim 13 wherein the causing the blockchain to be updated to reflect execution of the smart contract includes:

automatically causing priority access tier license registration data for the network operator to which the priority access tier license is leased to be stored on the blockchain, wherein storing of the priority access tier license registration data on the blockchain enables the SAS to be able to electronically validate via the blockchain that the wireless network operator may operate a wireless network using the priority access tier license to the shared frequency spectrum band in a protection area, within a service area of the priority access tier license, based on registration data.

15. The system of claim 1, wherein automatically causing the network operator to be able to operate a wireless network under the priority access tier license includes:

in response to receiving the indication of the at least one condition being met, electronically partitioning the priority access tier license such that the network operator may operate a wireless network under the priority access tier license in a particular geographic area within a geographic area covered by the priority access tier license.

16. The system of claim 1, wherein automatically causing the network operator to be able to operate a wireless network under the priority access tier license includes:

in response to receiving the indication of the at least one condition being met, electronically disaggregating the priority access tier license by spectrally segmenting the priority access tier license by frequency such that the network operator may operate a wireless network under the priority access tier license in a frequency band covered by the priority access tier license that is less than a full bandwidth covered by the priority access tier license.

17. The system of claim 1 wherein the priority access tier license is a Priority Access License (PAL) to use a 10 MHz channel within the 3550 to 3650 MHz band of the Citizens Broadband Radio Service (CBRS) shared frequency spectrum band, wherein the PAL provides protection from interference from General Authorized Access (GAA) tier users of the CBRS shared frequency spectrum band and the wireless network is a Fifth Generation (5G) wireless network.

18. The system of claim 1 wherein the system is controlled by the owner of the priority access tier license that is a wireless network service provider and the network operator is a current customer of the wireless network service provider.

19. A method comprising:

electronically receiving, by a device of an owner of a priority access tier license to a shared frequency spectrum band, an indication of at least one condition being met for leasing to a wireless network operator the priority access tier license to a shared frequency spectrum band; and in response to receiving the indication of the at least one condition being met, a system of the owner automatically causing the wireless network operator to be able to operate a wireless network using the priority access tier license to the shared frequency spectrum band.

20. A non-transitory computer-readable storage medium having computer-executable instructions stored thereon which, when executed by at least one processor, cause operations to be performed, the operations including:

electronically receiving, by a device of an owner of a priority access tier license to a shared frequency spectrum band, an indication of at least one condition being met for leasing to a wireless network operator the priority access tier license to a shared frequency spectrum band; and in response to receiving the indication of the at least one condition being met, a system of the owner automatically causing the wireless network operator to be able to operate a wireless network using the priority access tier license to the shared frequency spectrum band.

* * * * *